United States Patent [19]

Crossland et al.

[11] Patent Number: 4,722,594
[45] Date of Patent: Feb. 2, 1988

[54] TWO-DIMENSIONAL OPTICAL INFORMATION PROCESSING APPARATUS

[75] Inventors: William A. Crossland, Harlow; Anthony B. Davey, Bishops Stortford; Neil Collings, Harlow; Matthew F. Bone, Bishops Stortford, all of England

[73] Assignee: STC plc, England

[21] Appl. No.: 797,920

[22] Filed: Nov. 14, 1985

[30] Foreign Application Priority Data

Nov. 14, 1984 [GB] United Kingdom ............... 8428811

[51] Int. Cl.$^4$ .................... G02F 1/13; G03H 1/16
[52] U.S. Cl. .................... 350/350 S; 350/162.13; 350/162.14; 350/330; 350/350 R
[58] Field of Search .............. 350/350 S, 340, 348, 350/162.13, 162.14, 349, 332

[56] References Cited

U.S. PATENT DOCUMENTS

| | | | |
|---|---|---|---|
| 3,624,605 | 11/1971 | Aagard | 350/162.13 |
| 4,404,555 | 9/1983 | Long et al. | 340/784 |
| 4,514,038 | 4/1985 | Pichon et al. | 350/162.14 |
| 4,596,446 | 6/1986 | Waters et al. | 350/349 |
| 4,638,310 | 1/1987 | Ayliffe | 340/805 |

FOREIGN PATENT DOCUMENTS 2146473A 4/1985 United Kingdom .

OTHER PUBLICATIONS

Kondo et al, "A Practical Method of Preparing Thin Homogenous Ferroelectric Smectic Cells for Electro-Optical Microsecond Switches," Japanese Journal of Applied Physics, vol. 22, No. 2, Feb., 1983, pp. L85-L87.
Submicrosecond Bistable Electro-Optic Switching in Liquid Crystals' by N. A. Clark and S. T. Lagerwall. Appl. Phys. Lett., vol. 36, No. 11, pp. 889-901, Jun. 1980.
'Smectic Liquid Crystal Textures and Structures' by G. W. Gray & J. W. Goodby, (publ. Leonard Hill, 1984) p. 153.
'Ferroelectric Liquid Crystal Electo-Optics Using the Surface Stabilised Structure' by N. A. Clark, S. T. Lagerwall & M. N. Handschy, Mol. Cryst. Liq. Cryst, 1983, vol. 92, pp. 213-234.
'Soliton Switch in Chiral Smectic Liquid crystals' by P. E. Cladis, H. R. Brand and P. L. Finn, Physical Review A, vol. 28, No. 1, pp. 512-514 (Jul. 1983).
'Synthesis, Properties and Applications of Ferroelectric Smectic Liquid Crystals,' by J. W. Goodby, Ferroelectrics, 1983, vol. 49, pp. 275-284.
'The Phase Behavior of bis-(4'-n-Heptyloxybenzylidene)-1,4-Phenylenediamine (HEPTOBTPD), Crystal J and K Phases', by P. A. C. Gane et al., Mol. Cryst. Liq. Cryst., 1983, vol. 100, pp. 67-74.

*Primary Examiner*—John K. Corbin
*Assistant Examiner*—Martin Lerner
*Attorney, Agent, or Firm*—Kerkam, Stowell, Kondracki & Clarke

[57] ABSTRACT

Bistable operation of ferroelectric liquid crystal smectic I* or smectic F* cells is disclosed which uses a greater liquid crystal layer thickness than is achievable with smectic C* material while yet retaining bistability of operation. One or more such cells are employed in two-dimensional information processing apparatus.

9 Claims, 6 Drawing Figures

TWO-DIMENSIONAL OPTICAL INFORMATION PROCESSING APPARATUS

BACKGROUND TO THE INVENTION

This invention relates to two-dimensional optical information processing (OIP) apparatus, and in particular to such apparatus incorporating a ferroelectric smectic liquid crystal cell.

The first types of liquid crystal display cell to be used as display devices employed nematic or cholesteric phases. Those that operated in field effect mode could typically be operated with signal strengths of a few volts, but when the exciting field was removed, the liquid crystal always relaxed back into the same state within a short period of time. Then our UK Patent Specification No. 1557199 described how an electrically addressable non-volatile liquid crystal display can be provided. This employed a smectic A liquid crystal filling to provide bistability of operation. A drawback of this approach was that it required a significantly greater drive voltage. Later, in a paper entitled 'Submicrosecond bistable electro-optic switching in liquid crystals' by N.A. Clark and S.T. Lagerwall appearing in Applied Physics Letters Vol. 36 No. 11 pp 889-901 (June, 1980), a bistable cell switchable with smaller voltages was described that employed a ferroelectric smectic C liquid crystal filling.

The terms 'bistable' and 'bistability' are used here and elsewhere in this specification in relation to a situation in which a liquid crystal is electrically switchable between two latching states that are optically distinct on a macroscopic scale so that under appropriate illumination conditions, for instance by direct viewing or by viewing in position between appropriately oriented crossed polarisers, the cell is capable of functioning as a display element electrically switchable between two latched conditions of contrasting appearance.

In order to exhibit ferroelectricity, a smectic material must not only exist in an tilted smectic state such as Smectic C, I or F, but it must also be constituted by a material that is intrinsically chiral, or it must include a chiral constituent to provide chirality. For a definition of the ordering of the different smectic phases, reference may be made to the book entitled 'Smectic Liquid Crystals Textures and Structures' by G.W. Gray and J.W. Goodby, published by Leonard Hill (1984), and in particular to the diagrams appearing on page 153 of that book. According to convention chirality may be signified by an *, and thus the material employed in the Clark and Lagerwall cell may be described as a C* material.

The chirality of a ferroelectric liquid crystal material in a C*, I* or F* phase means that its molecules have a natural tendency to align themselves in progressively different directions in succeeding smectic layers. If the layers are arranged in parallel planes this progression defines a helix, and the pitch of this helix is typically in the region of 2 to 3 microns unless it has been lengthened by diluting the chiral molecules with non-chiral ones or with further chiral molecules of the opposite handedness.

The Clark and Lagerwall paper previously referred to describes the bistable operation of a cell with a 1.5 micron thick layer of DOBAMBC or HOBACPC maintained in a C* phase with its smectic layers aligned in parallel planes perpendicular to the plane of the liquid crystal layer itself. Under these conditions it was observed that the tendency to helical arrangement of the liquid crystal molecules had been suppressed, and the authors attributed the bistable operation they found to this suppression of the helical structure by surface stabilisation.

In a later paper entitled 'Ferroelectric Liquid Crystal Electro-Optics Using the Surface Stabilised Structure' appearing in Mol. Cryst. Liq. Cryst. 1983 Vol. 94 pp 213-234 these authors, in collaboration with M.A. Handschy, report further about work undertaken with such cells, describes the bistability observed in a cell containing a 2 micron thick layer of C* phase DOBAMBC, and in both C* and I* HOBACPC in a cell 1.5 microns thick cell. (In this paper the I* phase of HOBACPC has been incorrectly identified as the F* phase, but this has been corrected in later publications.)

The validity of the theory that the suppression of helix formation is effective in providing bistability of operation has been investigated by ourselves and others. In our work with C* phase material we have been unable to demonstrate any bistability of operation in cells providing a liquid crystal layer thickness of 4 microns or greater even when the pitch of the bulk material filling the cell was several times greater than the layer thickness. This finding is given support in the literature. Thus P.E. Cladis and H.R. Brand, in a paper entitled '"Soliton switch" in chiral smectic liquid crystals', appearing in Physical Review A Vol. 28 No. 1 pp 512-4 (July 1983), report that in their investigations performed using 10 microns thick cells filled with C* phase materials having pitches in the range from 10 to 100 microns they found no evidence of bistability even with switching fields as high as $6 \times 10^5$ V cm$^{-1}$. This paper concludes with the sentence, 'Furthermore, we have demonstrated that, in general, production of samples with a thickness smaller than the pitch does not lead to bistability in chiral smectics'. Similarly in a paper entitled 'Synthesis, Properties and Applications of Ferroelectric Smectic Liquid Crystals' appearing in Ferroelectrics, 1983, Vol. 49 pp 275 to 284, in the section entitled 'Applications', J.W. Goodby states that, 'The smectic phases C*, I* and F* can be used in three different ways. (1) Thin cells, 1-3 microns thick in which the helix is unwound and the cell is bistable. The switching speed from one tilt domain to another is in the microsecond range. Optical contrast is achieved with crossed polarisers. (2) Thick cells where the helix is unwound. The cell is not bistable but the switching speed can still be in the microsecond range. This cell has similar viewing angle properties and contrast to a conventional twisted nematic device. (3) Thick cells where the helix is not unwound. The cell is not bistable and has similar properties to (2)'.

In summary, for C* phase material of any pitch, no bistability of operation has been reported for cells having a liquid crystal layer thickness of greater than 3 microns. Similarly no prior art reports any other type of ferroelectric cell with a liquid crystal layer thickness greater than 3 microns that exhibits bistability of operation. It is believed that, for pitches up at least to several tens of microns, the pitch is unwound when the layer thickness is less than the pitch. It therefore appears that the suppression of pitch is not the paramount factor determining whether or not bistability of operation is exhibited. We believe that bistability is determined by the type of order present in the phase of the material present in the cell.

SUMMARY OF THE INVENTION

The present invention is concerned with ferroelectric liquid crystal OIP cells having liquid crystal layer thicknesses significantly in excess of 3 microns that do exhibit bistability. More particularly the present invention is concerned with the discovery that the behaviour of I* and F* materials is sufficiently different from that of C* materials to allow the essentially bistable operation of I* and F* material filled display cells having a liquid crystal layer thickness significantly greater than the limit in the region of 3 microns that is characteristic of known display cells employing C* material. This bistability in I* and F* material filled cells does not necessarily require the surface stabilised suppression of the helices by virtue of the thinness of the liquid crystal layer. In the case of I* or F* material it is believed that the unwinding of the helix is a bulk stabilised effect resulting from an extensive three dimensional bond orientational ordering present in such I* and F* materials. The presence of a bulk stabilised effect, rather than a surface stabilised one, may be directly inferred from the observation of the behaviour of pitch lines in a cell whose liquid crystal layer thickness is so great that pitch lines appear or are retained when the cell is cooled into the I* or F* phase in the absence of an applied electric field. When an electric field of sufficient strength is first applied these pitch lines disappear, but when the field is removed they do not immediately reappear. The presence of the pitch lines, before the application of the field, indicates that the layer was not surface stabilised; whereas the absence of pitch lines after removal of the electrical field indicates that stabilisation has been effected by some phenomenen other than surface stabilisation. The surface thus appears to play a secondary role in the bistable operation of these I* and F* cells. Experiments have however revealed that this bistability does not extend indefinitely with liquid crystal layer thickness, but has been shown that at least with certain materials to exist out to thicknesses well in excess of 20 microns.

According to the present invention there is provided two-dimensional optical information processing apparatus incorporating at least one ferroelectric liquid crystal cell exhibiting bistability of operation, which cell has a smectic I* or F* phase liquid crystal layer confined between opposed electroded plates whose inward facing surfaces have been treated to promote planar alignment of the adjacent liquid crystal molecules in the same direction at each of the two surfaces, which plates serve to define a liquid crystal layer in the range from 4 to 40 microns.

Generally, it is preferred to employ a liquid crystal layer thickness of less than 20 microns.

BRIEF DESCRIPTION OF THE DRAWINGS

In the following description of preferred embodiments of the invention, reference is made to the accompanying drawings in which.

DETAILED DESCRIPTION OF PREFERRED EMBODIMENTS

Figure 1:
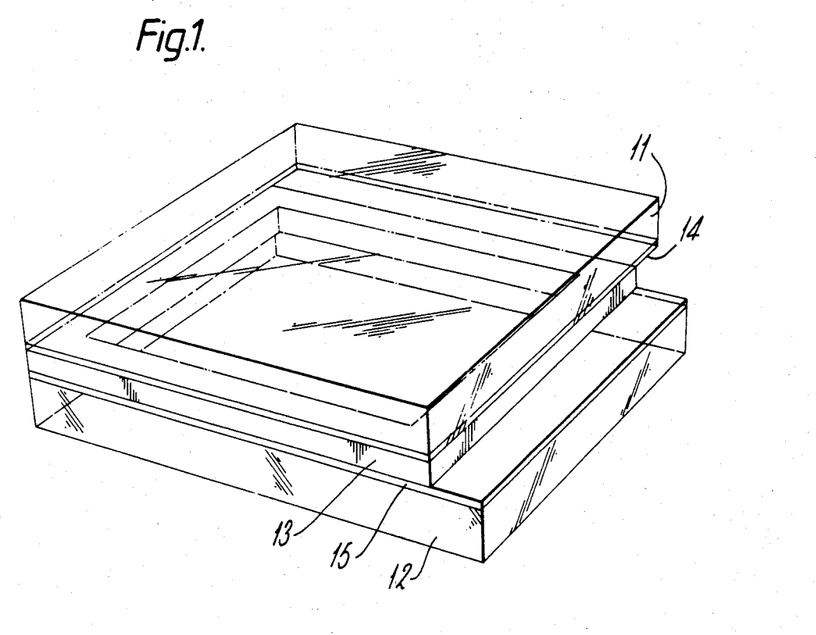
FIG. 1 depicts a schematic perspective view of an OIP liquid crystal cell.

A hermetically sealed envelope for liquid crystal layer is formed by securing together two glass sheets 11 and 12 with a perimeter seal 13. The inward facing surfaces of the two sheets carry transparent electrode layers 14 and 15 of indium tin oxide, and each of these electrode layers is covered within the display area defined by the perimeter seal with a polymer layer, such as polyimide (not shown), provided for molecular alignment purposes. Both polyimide layers are rubbed in a single direction so that when a liquid crystal is brought into contact with them they will tend to promote planar alignment of the liquid crystal molecules in the direction of the rubbing. The cell is assembled with the rubbing directions aligned parallel with each other. The thickness of the liquid crystal layer contained within the resulting envelope is determined by the thickness of the perimeter seal, and control over the precision of this may be provided by a light scattering of short lengths of glass fibre (not shown) of uniform diameter distributed through the material of the perimeter seal. Conveniently the cell is filled by applying a vacuum to an aperture (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the two apertures are sealed.) The filling operation is carried out with the filling material heated into its isotropic phase so as to reduce its viscosity to a suitably low value. It will be noted that the basic construction of the cell is similar to that of for instance a conventional twisted nematic, except of course for the parallel alignment of the rubbing directions. For one example the liquid crystal filling of a 10.7 micron thickness cell was the chiral ester this material being marketed by BDH under the designation CE8. When heating this material from the crystalline state the following transition temperatures were noted:

| | |
|---|---|
| Smectic J* to Smectic I* | 67° C. |
| Smectic I* to Smectic C* | 70.3° C. |
| Smectic C* to Smectic A | 80.7° C. |
| Smectic A to Cholesteric | 135° C. |
| and Cholesteric to Isotropic | 140° C. |

When, after filling, the cell was slowly cooled the planar alignment inducing nature of the rubbed polyimide surfaces caused the alignment of the smectic layers formed on entering the smectic A phase to be in planes normal to the rubbing direction, and hence perpendicular to the planes of the major surfaces of the liquid crystal layer. This alignment of the smectic layers was maintained as the liquid cooled into the smectic C* phase even though the orientations of the molecules within those smectic layers changed upon entering the C* phase. At this stage pitch lines could be observed. This indicated that the cell was too thick for unwinding the helix solely by surface effects. This was to be expected since the liquid crystal layer thickness was considerably greater than the helix pitch (about 2 microns for this material in the C* phase). A slight change of scale in the pitch lines (c. 10%) was observed when, upon further cooling, the filling entered the I* phase.

Figure 2:
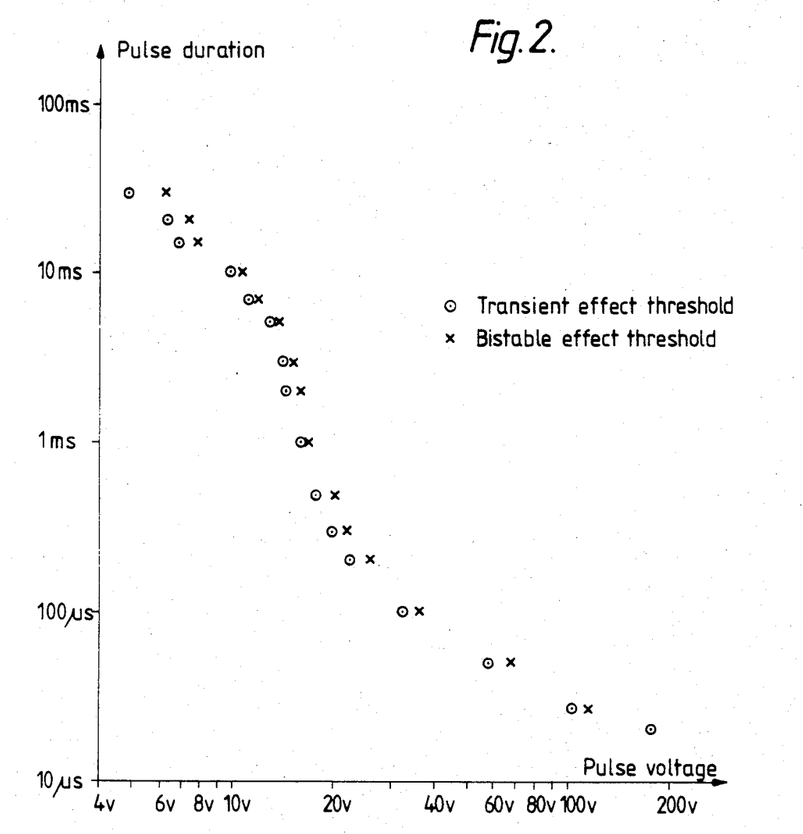
FIG. 2 is a graph of a log log plot of switching pulse duration and switching pulse voltage, for a specific filling and thickness of cell constructed according to FIG. 1.

With the cell maintained at a temperature of 69.8° C. so that its filling was maintained in the I* phase, a series of tests was performed to see how switching was affected by voltage. For this purpose the cell was mounted between crossed polarisers aligned with their polarisation planes at 45° to the rubbing direction. A plot of the results is illustrated in the graph of FIG. 2 where the log of pulse duration is plotted as a function of the log of pulse voltage. In practice the results were obtained by increasing the voltage of a pulse of known duration. For each pulse length there is plotted a transient effect threshold voltage at which the effect of the switching voltage first becomes noticeable but is not sustained. The corresponding bistable effect threshold voltage is a measure of the larger voltage at which switching is established with no significant relaxation even over periods exceeding 2 hours. (It is believed that relaxation may not be noticeable for a considerably longer period, but with the particular apparatus being employed it was not possible to establish this because adequate temperature stabilisation could not be ensured over periods significantly longer than 2 hours.) From FIG. 2 it is seen that the bistable switching time varies approximately with the inverse of the voltage over the range 115 volts down to about 25 volts. At lower voltages down to about 12.5 volts it varies approximately as the inverse sixth power of the voltage, while at still lower voltages, with pulse duration in excess of 10 msec, it varies approximately as the inverse square of voltage. When the cell was first bistably switched with an electric field the helix lines disappeared and did not reappear while the cell was maintained in the smectic I* phase. A second cell was constructed using a thicker perimeter seal providing a liquid crystal layer thickness of about 20 microns. This showed similar properties of bistability to those of the 10.7 micron cell, though the switching voltages were higher.

A third cell was then constructed with a spacing of about 30 microns. In this instance there was not true bistability, and noticeable relaxation effects could be observed within a few seconds of pulsing. It is believed that this results because the liquid crystal layer is now so thick that the alignment of the smectic layers in planes at right angles to the confining surfaces is no longer adequately enforced throughout the layer thickness. It is similarly believed that the extinction of bistability which is observed in the material when in the smectic C* phase that is observed when the cell thickness is expanded beyond a limit in the region of 3 microns is attributable to the same cause, the smaller thickness limit necessary for securing planar alignment of the smectic layers being occasioned by the absence of the hexatic structure of the material when in the C* phase.

It is to be clearly understood that the specific smectic I* material exemplified is not held out to be an optimised material for OIP applications. By suitable admixture of other materials the temperature range of the I* phase can be shifted and extended. Furthermore, the switching efficiency can be improved by the incorporation of material with a higher polarisation than that of CE8. By way of example a fourth cell with a 40 microns liquid crystal layer thickness filled with non-chiral (racemic) CE8 to which had been added approximately 6 wt % of a chiral ester providing increased polarisation, and also a longer pitch, is still not too thick to exhibit bistability of operation. Such additives must leave the mixture in the I* or F* phase at the working temperature, but do not individually have to exhibit either of those phases.

Figure 3:
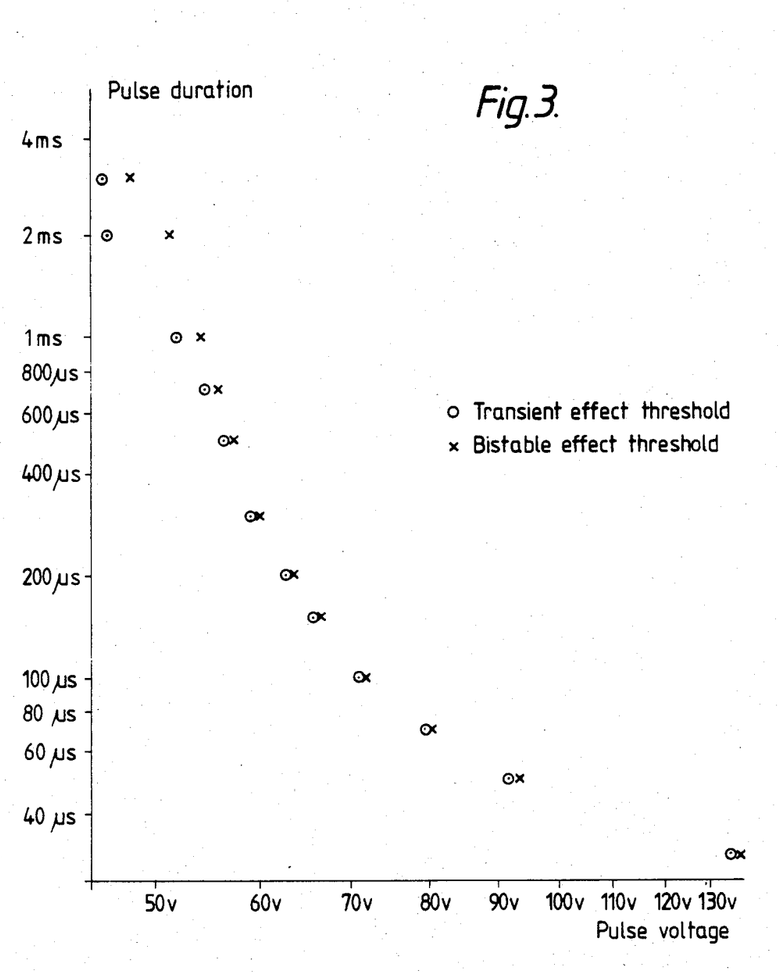
FIG. 3 is a similar graph plotting results obtained with a different filling and thickness.

By way of further example tests were also carried out on a cell containing the alternative ferroelectric hexatic smectic phase, smectic F*. For this purpose material known to exhibit an F phase (from a paper by P.A.C. Gane et al appearing in Mol. Cryst. Liq. Cryst. 1983, Vol. 100, pp 67 to 74) was rendered ferroelectric by the admixture of a chiral ester dopant. The resulting mixture comprised 20.8 wt % HEPTOBPD (bis-4'-n-heptyloxybenzylidene)-1,4-phenylenediamine), 79.2 wt % TBBA (terephthalylidene-bis-n-butyl aniline), and 6.1 wt % chiral ester dopant. This mixture exhibits an F* phase from 110° C. to 130° C. which is depressed by about 9° from that of the undoped HEPTOBPD/TBBA mixture. FIG. 3 depicts on a log log scale how the switching pulse duration varied as a function of switching voltage for an 8.9 microns thick layer of this F* phase material when maintained at a temperature of 124° C. The dilution of the chiral dopant by the HEPTOBPD/TBBA mixture provided a pitch helix for the bulk material significantly longer (c. 40 microns) than the layer thickness, and hence no pitch lines were seen in this cell.

The ability to construct relatively fast switching bistable cells with a liquid crystal layer thickness significantly greater than 3 microns is advantageous because it means that much of the technology previously developed for other types of cell, such as twisted nematic and phase change cells, can now be expected to be applied with little modification to the manufacture of these cells; whereas rather more significant changes would likely to be required if the thickness range developed for those other types of cell had to be substantially reduced to bring the thickness beneath the 3 microns threshold.

Attention is now turned to illustrative two-dimensional OIP applications for cells of the general type described above. One form in which such cells may be used for two-dimensional OIP is for the creation of a two-dimension array of pixels. For a transmission type multiplexed (matrix addressed) cell, the cell construction can be substantially as previously described with reference to FIG. 1. Transparent electrode layer 14 consists of a finely spaced set of rows or columns, while electrode layer 15 consists of a similar set extending in the orthogonal direction. Typically, with a view to obtaining the maximum information density, the electrode rows and columns are made as narrow as conveniently possible, and similarly the inter-row and inter-column electrode spacings are also made as narrow as possible. If the satisfying of these criteria means that the inter-pixel spacings are not significantly smaller than the widths of the pixels themselves, then it will generally be preferred to arrange for the inter-row and inter-column electrode spacings to be occupied by opaque material so that the modulated light, that is the light that passes through the pixels, is not swamped by the unmodulated light that would otherwise be able to pass through the areas between neighbouring pixels.

Remembering that a ferroelectric cell is sensitive to the direction of an applied electric field, many types of matrix addressing systems developed for use with other types of liquid crystal mode devices will not be suitable for this application. One type of addressing scheme which does take account of this polarisation direction sensitivity, and which is thus suitable for these cells is based on the use of bipolar pulses, and is described in the United Kingdom Patent Specification No. GB-A 2146473 to which attention is directed.

For a reflex type multiplexed (matrix addressed) cell, in which a specular reflector is located behind the liquid crystal layer, the cell construction can incorporate an active silicon single crystal slice to replace the transparent rear sheet of a transmission type device. Such a sheet carries an array of metal pads whose members are connected with the drains of an associated array of FET's formed in the silicon, this array of FET's being accessed on a co-ordinate basis. The pixels of the cell are defined by the regions of the liquid crystal layer that lie between these pads and a transparent counter-electrode carried on the inward-facing surface of the transparent front sheet of the cell. Specular reflection at the rear of the liquid crystal layer is required over the areas registering with the pixels, and in some circumstances this may be provided by the reflective properties of the metal pads, but if the flatness is not adequate, then the whole surface may be coated with dielectric material to improve the flatness, and then a multilayer interference filter type reflector is deposited on top of that. Since the device works in reflective mode, the front sheet of the cell needs to be made of good optical quality glass and should be provided with an anti-reflection coating on its front surface.

Figure 4:
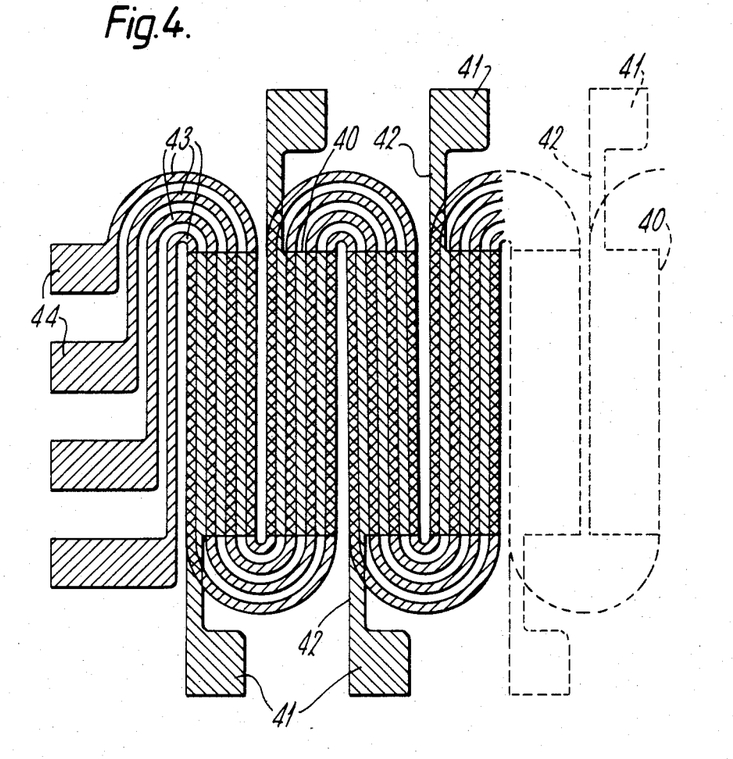
FIG. 4 is a schematic diagram of the electrode layout of a one dimensional linear array cell.

Linear arrays of pixels, rather than two dimensional arrays, can also be used for two-dimensional OIP, for instance by having two linear arrays with one arranged side by side in the input plane and, in the Fourier transform plane, some means for recording the interference patterns of their Fourier transforms. A linear array can have a construction similar to the two-dimensional array, with the difference that, instead of having a set of column electrodes facing the row electrodes, the row electrodes are faced by a single large area counter-electrode. When particularly fine resolution is required the problem may arise of accessing the individual electrodes. One way of easing this problem is to employ a two-dimensional accessing for a one-dimensional pixel array. An example of such a system is illustrated in FIG. 4. The sheet on one side of the liquid crystal layer carries a set of substantially rectangular transparent electrodes 40 which extend widthwise across the cell and are provided with terminal pads 41 and connecting links 42. The sheet on the other side of the liquid crystal layer carries a set of serpentine transparent electrodes 43 with terminal pads 44. In this instance four electrodes 43 are depicted. All the members of each loop register with each one of the rectangles 40 to define overlapping areas, the pixels, having the form of a regular array of uniformly spaced straight strips. The additional areas of overlap, where the connecting links 42 are overlapped by the serpentine electrodes 43, can conveniently be masked out with opaque matter if they prove a nuisance.

The binary electro-optic effect provided by these cells, whether they incorporate linear or two-dimensional pixel arrays, can be employed in an amplitude modulation mode, a bipolar mode, or a guest dyed amplitude modulation mode.

In amplitude modulation mode operation a transmission type cell is irradiated with an extended wavefront of linearly polarised coherent monochromatic light. The cell is arranged in relation to this polarisation plane so that in one of the cell states the liquid crystal director lies in that plane. The light transmitted by the cell then passes through a polarisation analyser, which is set with its polarisation plane in crossed relationship with the plane of polarisation of the light incident upon the cell. The birefringence and thickness of the liquid crystal layer within the cell are chosen so that it will function as a half wave retardation plate.

The effect of energising of the cell is to rotate the fast axis of this half wave plate through the angle between the two director states of the cell. Preferably, by choice of composition of the cell, this angle is chosen to be near 45° so that, with appropriate orientation of the cell, energisation produces a 90° rotation of polarisation plane. It may be noted that in the I* and F* phases the angle between the director states is much less heavily dependent upon temperature than in the C* state, and therefore temperature regulation is not so critical.

In the phase modulation mode a similar arrangement applies, but with the difference that in this instance the plane of polarisation of the incident light bisects the angle between the two directors. Under these circumstances switching produces a 180° change of phase instead of a change of amplitude. A primary advantage of the resulting phase coding is that it reduces the d.c. spot amplitude in the Fourier plane by destructive interference.

These amplitude modulation and the phase modulation modes of operation can readily be adapted for use with reflex type cells instead of transmission type ones. This involves dispensing with the polarisation analyser, and instead directing the incident light on to the cell via a polarisation beam splitter.

The analyser is also dispensed with in the amplitude modulation mode if a guest pleochroic dye is incorporated into the liquid crystal to give a guest dyed amplitude modulation mode. If the cell is of the reflex type, the beam splitter is not a polarisation beam splitter, but is of conventional construction not intended to be polarisation sensitive.

Figure 5:
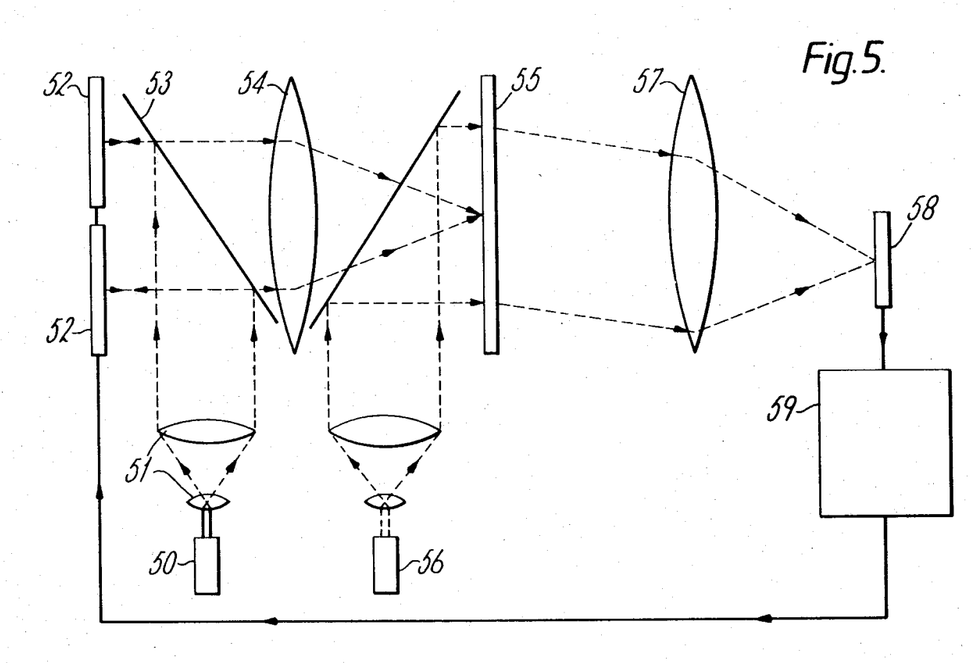
FIG. 5 is a schematic diagram of a joint transform correlator employing a pair of I* and F* ferroelectric liquid crystal cells.
Figure 6:
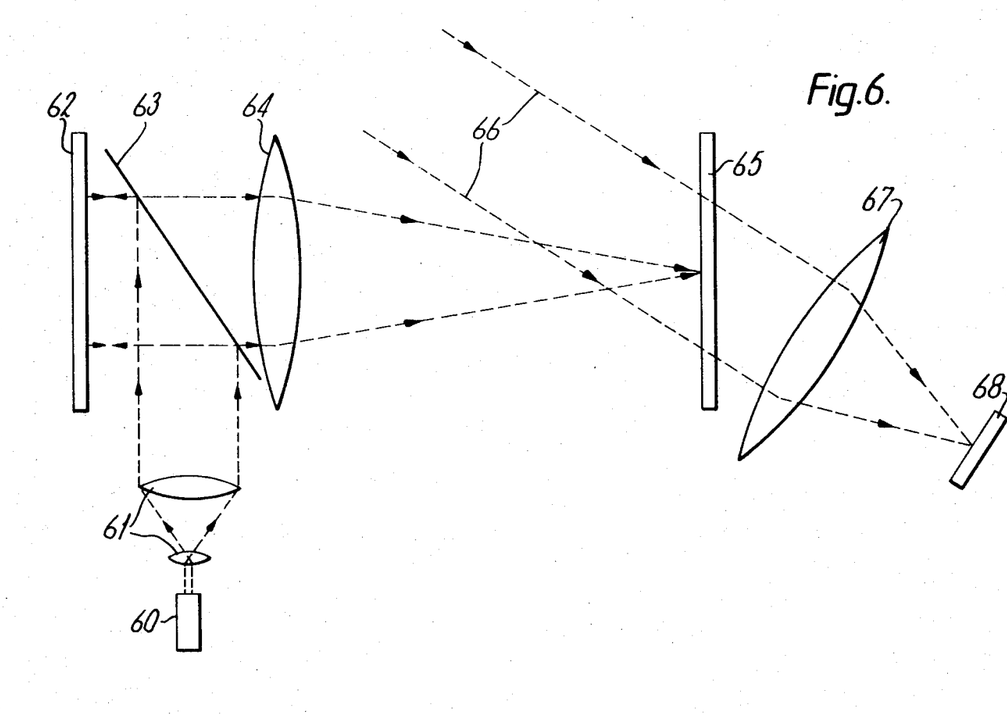
FIG. 6 is a schematic diagram of a frequency plane correlator employing a single I* or F* ferroelectric cell.

FIGS. 5 and 6 depict respectively schematic representations of a joint transform correlator and of a frequency plane correlator which employ ferroelectric liquid crystal cells. In the case of the joint transform correlator of FIG. 5, plane polarised light from a laser 50 is beam expanded at 51 and directed on to a pair of reflex type I* or F* ferroelectric cells 52 via a polarisation beam splitter 53. One of the cells 52 carries the object data for correlation with the scene data carried by the other cell. A first Fourier transform lens 54 collects the reflected light and directs it to interfere in the Fourier transform plane where is located a recording device 55. For real-time correlation this may be for instance a bismuth silicon oxide detector. This recording device is interrogated with light from a second laser 56. Diffracted light is collected by a second Fourier transform lens 57 and directed to a photodetector 58 positioned in the Fourier transform plane. The resulting output from the detector is fed to a processing unit 59 for utilisation.

In the case of the frequency plane correlator of FIG. 6, plane polarised light from a laser 60 is beam expanded at 61 and directed on to a single reflex type I* or F* ferroelectric cell 62 via a polarisation beam splitter 63. A first Fourier transform lens 64 collects the reflected light and directs it to a recording device 65 positioned in the Fourier transform plane where it is interferred with a collimated reference beam 66. A second Fourier transform lens 67 is positioned to collect light that has been reflected by the cell 62 now programmed with alternative information, this light being such as to act on the stored information of the recording device to reconstruct the reference beam if there is correlation between the alternative information content of cell 62 and its original information content. This light collected by lens 67 is directed to a photodetector positioned in the correlation plane.

Minor modifications to the correlators of FIGS. 5 and 6 are of course necessary to adapt them for use with transmission type cells rather than reflex type ones.

We claim:

1. Two-dimensional optical information processing apparatus incorporating at least one ferroelectric liquid crystal cell exhibiting bistability of operation, which cell has a smectic I* or F* phase liquid crystal layer confined between opposed electroded plates whose inward facing surfaces have been treated to promote planar alignment of the adjacent liquid crystal molecules in the same direction at each of the two surfaces, which plates serve to define a liquid crystal layer with a thickness in the range from 4 to 40 microns.

2. Apparatus as claimed in claim 1, wherein the or each liquid crystal layer thickness is less than 20 microns.

3. Apparatus as claimed in claim 1, wherein a pleochroic dye is dispersed in the or each liquid crystal layer.

4. Apparatus as claimed in claim 1, wherein the or each cell is a transmission type cell.

5. Apparatus as claimed in claim 1, wherein the or each cell is a reflex type cell.

6. Apparatus as claimed in claim 1, wherein the or each cell is adapted to operate in an amplitude modulation mode.

7. Apparatus as claimed in claim 1, wherein the or each cell is adapted to operate in a phase modulation mode.

8. Apparatus as claimed in claim 1, which apparatus is a joint transform correlator.

9. Apparatus as claimed in claim 1, which apparatus is a frequency plane correlator.

* * * * *